June 1, 1937.　　　　E. C. RANEY　　　　2,082,551
ELECTRIC VULCANIZER
Filed Feb. 1, 1934　　　　4 Sheets-Sheet 3
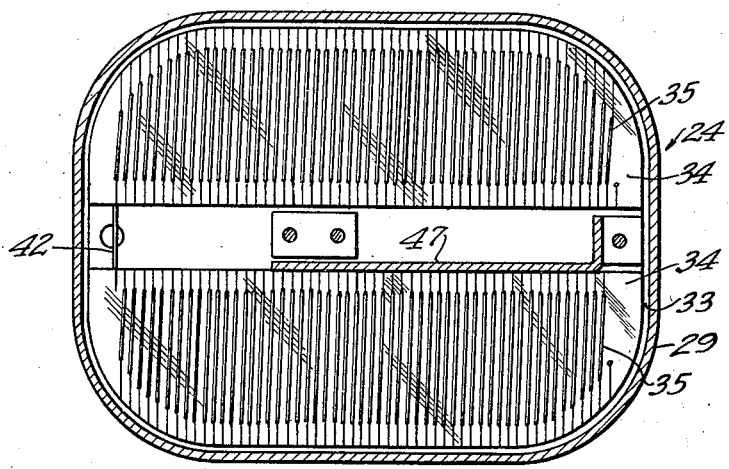
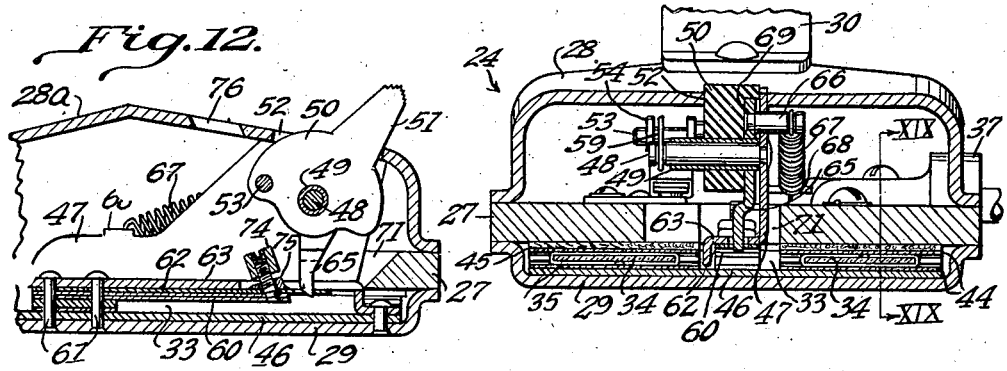
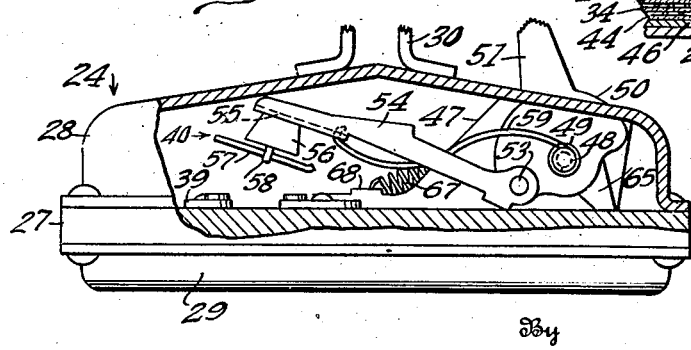
Inventor
Estel C. Raney
By W. S. McDowell
Attorney June 1, 1937.   E. C. RANEY   2,082,551
ELECTRIC VULCANIZER
Filed Feb. 1, 1934   4 Sheets-Sheet 4
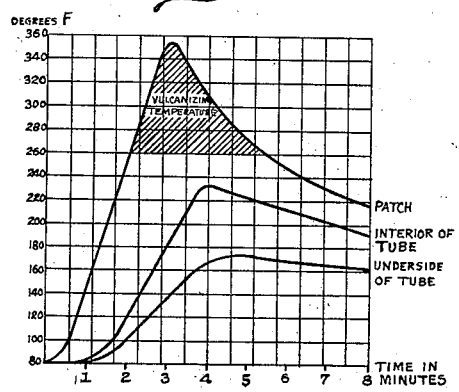
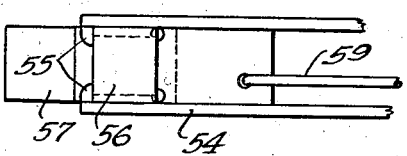
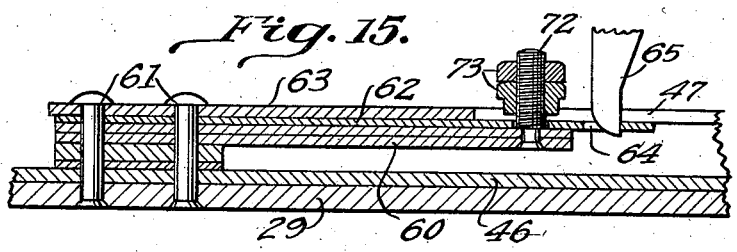
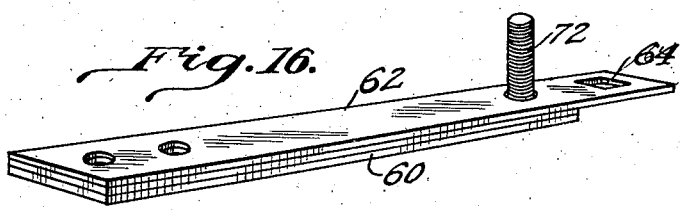
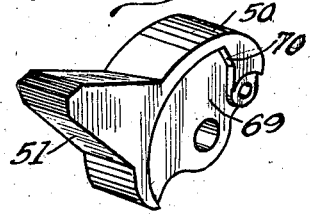
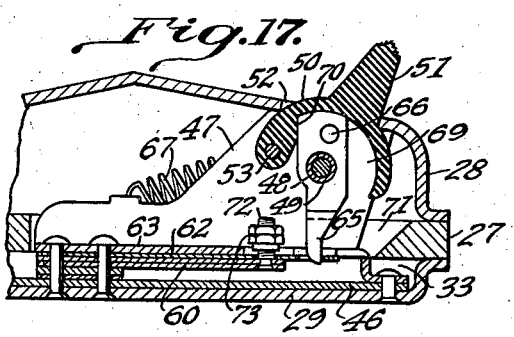
Inventor,
Estel C. Raney
By W. S. M. Howell
Attorney Patented June 1, 1937

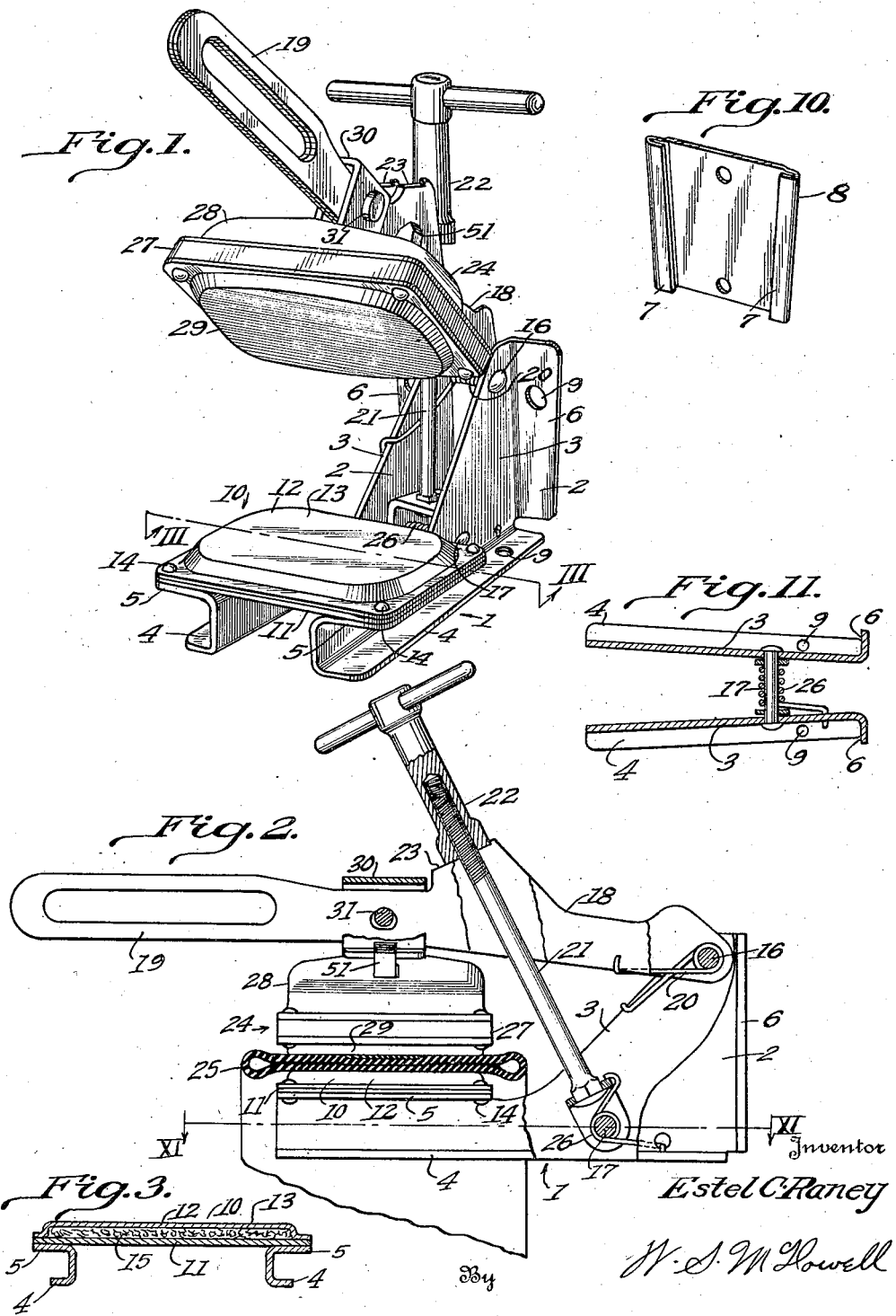

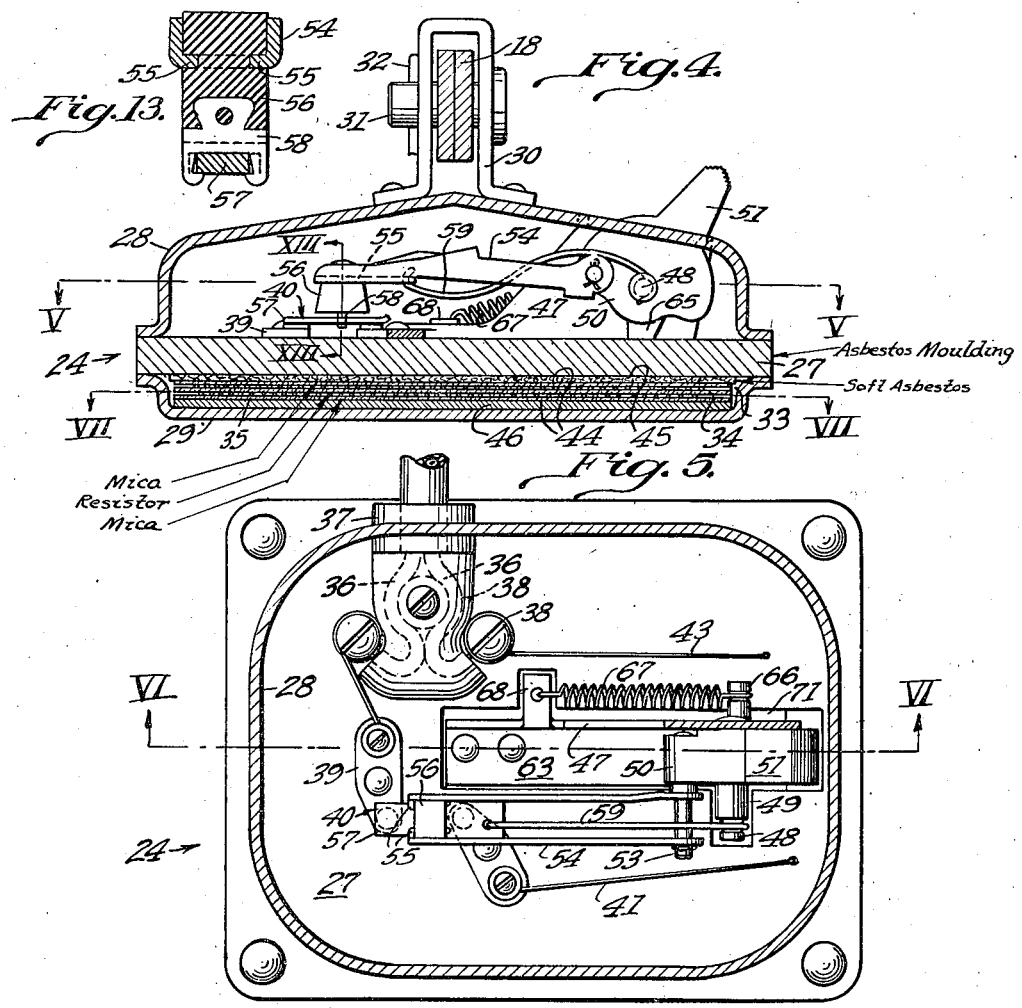

2,082,551

UNITED STATES PATENT OFFICE 2,082,551

ELECTRIC VULCANIZER

Estel C. Raney, Columbus, Ohio, assignor to Ranco Incorporated, Columbus, Ohio, a corporation of Ohio Application February 1, 1934, Serial No. 709,385

8 Claims. (Cl. 219—19)

This invention relates to an improved electrically heated vulcanizer for use in the repair of rents, tears or openings in rubber or rubber-containing objects, for instance, motor vehicle tires, tubes and the like.

It is a primary object of the invention to provide an improved electric vulcanizer of compact and sturdy construction, simple, rapid and economical to operate and adapted for the ready reception of tire tubes and other objects possessing varying shapes, thicknesses and other physical characteristics.

It is another important object of the present invention to provide an electric vulcanizer with a movable shoe which is adapted to be brought into clamping engagement with the rubber article to be vulcanized, and wherein the shoe is provided with an electric heating element by means of which heat is transmitted through the under surface of the shoe to heat a rubber article to a desired vulcanizing temperature, and wherein thermostatic means are provided for automatically discontinuing the flow of current through the heating element after a predetermined vulcanizing temperature in any given operation has been attained, so that the danger of overheating, or maintaining the heating operation for too long a period of time will be avoided and injury to a rubber article undergoing vulcanization will be prevented irrespectively of the degree of attention given to the vulcanizing operation by an attendant.

I am aware that heretofore it has been proposed to provide electric tire vulcanizers with thermostatic switch means for maintaining desired vulcanizing temperatures for an indefinite period of time but such prior devices have required an act of the operator, such as the operation of a manually controlled switch, to discontinue the flow of current through the resistance coils of the heating element to arrest any given vulcanizing operation. It frequently occurs, particularly in conducting the business of most garages, that the attention of an operator may be removed from the vulcanizer while the latter is heating. If such a vulcanizing operation continues for too long a period of time, the goods acted upon are apt to be damaged and suffer irreparable injury, and this may take place irrespective of the fact that the heating element of the vulcanizer contains an automatic temperature regulating switch. By the present invention, however, I provide in connection with such a vulcanizer a combined manually operable and self-opening switch by which the functioning of the heating unit of the vulcanizer may be interrupted by positive manual action and/or by automatic action.

It is another object of the invention to provide an electric vulcanizer having a heating element so designed as to confine the electrically generated heat to the vulcanizing surfaces of the heating element and prevent waste or dissipation of the developed heat and, further, to provide means for assuring uniform temperature at all points on its vulcanizing surface, thus permitting economy in current consumption as well as to obtain proper heating of the rubber article undergoing vulcanization.

For a further understanding of the invention, reference is to be had to the following description and the accompanying drawings, wherein:

Fig. 1 is a perspective view of an electric vulcanizer constructed in accordance with the present invention, the stationary and movable shoes of the vulcanizer being shown in their separate or open positions.

Fig. 2 is a view in side elevation of the vulcanizer, parts thereof being broken away and shown in section to disclose interior structure. In this figure, the stationary and movable shoes of the vulcanizer are disclosed in closed order and in engagement with a rubber article undergoing vulcanization.

Fig. 3 is a detail view taken through the base section of the vulcanizer and the stationary shoe supported in connection therewith, the plane of the view being indicated by the line III—III of Fig. 1.

Fig. 4 is a vertical sectional view taken through the movable shoe section of the vulcanizer and disclosing more particularly the electrical heating element arranged therein and associated switch mechanism;

Fig. 5 is a horizontal sectional view taken through the movable shoe member on the line V—V of Fig. 4 and disclosing in plan the novel switch mechanism arranged in the casing of the movable shoe or heating element;

Fig. 6 is a vertical sectional view taken on the plane indicated by the line VI—VI of Fig. 5, disclosing the switch mechanism in its position of circuit closure and with the by-metal thermostatic means retaining the switch mechanism in its position of circuit closure;

Fig. 7 is a horizontal sectional view on the line VII—VII of Fig. 4 and disclosing more particularly the arrangement and construction of the resistor coils constituting the heating unit of the vulcanizer;

Fig. 8 is a vertical transverse sectional view taken through the unit and associated switch mechanism on the plane indicated by the line VIII—VIII of Fig. 6;

Fig. 9 is a detail view partly in vertical section and in side elevation of the movable shoe or heating element with the switch mechanism in its position of circuit opening;

Fig. 10 is a detail perspective view of a mounting plate which may be employed for cooperation with the base section of the vulcanizer to permit of its ready connection with or removal from a cooperative support;

Fig. 11 is a horizontal sectional view taken through the base section of the vulcanizer on the plane indicated by the line XI—XI of Fig. 2;

Fig. 12 is a detail sectional view of a slightly modified form of thermostatic release for the resistor switch mechanism, wherein the release is adjustable from the exterior of the housing of the heating element;

Fig. 13 is a detail vertical sectional view on the line XIII—XIII of Fig. 4, disclosing in vertical section the pivoted arm of the switch mechanism and its associated bridge;

Fig. 14 is a detail plan view of the switch arm with the bridge carried thereby;

Fig. 15 is an enlarged vertical sectional view through the adjustable thermostatic means for controlling the opening of the associated switch mechanism when the vulcanizer attains a predetermined temperature;

Fig. 16 is a perspective view of the by-metal thermostatic element;

Fig. 17 is a vertical sectional view taken through the heating element of the vulcanizer and disclosing in vertical section the combined manually and automatically closing switch mechanism;

Fig. 18 is a detail perspective view of the manual actuating element of the switch mechanism.

Fig. 19 is a vertical sectional view taken through the lead-in conductors on the plane indicated by the line XIX—XIX of Fig. 8;

Fig. 20 is a graph in which curves are plotted to show the degree of heat attained by the patch and various portions of the tube during the vulcanizing operation.

My improved vulcanizer, as illustrated in the accompanying drawings, comprises a base section 1 which may consist of a pair of duplicate, reversely arranged steel stampings 2, the latter being formed to comprise vertical side walls 3 of substantially triangular configuration, the latter being provided along their lower edges with outwardly directed substantially horizontally disposed base flanges 4 and along a portion of their upper edges with outwardly directed horizontally disposed supporting flanges 5. The rear vertical edges of the walls 3 terminate in outturned vertical flanges 6, which possess a somewhat wedge-shaped configuration, which enables the flanges 6 to be received, for instance, in the converging flanged guides 7 of a fastening bracket 8. This plate may be secured to a vertical wall, bench or other convenient support and the vulcanizer as a whole removably connected therewith by inserting the flanges 6 of the base section 1 into the guides 7. The wedge shaped formation of the flanges 6 and the guides 7 results in securely retaining the vulcanizer in connection with the base plate for all practical purposes. Likewise the base plate 8 may be secured on a horizontally disposed supporting surface for association with the flanges 4 of the base section. As shown in Fig. 11, the steel stampings 2 of the base section converge in a tapering manner toward the rear of the base section, thereby adapting the flanges 4 to the configuration of the guides 7. It will be understood, however, that the attaching plate 8 may be omitted if desired, and to that end the flanges 4 and 6 are provided with openings 9 for the reception of fastening devices such as screws or bolts, by which the base section may be directly and rigidly attached to any suitable support.

The vulcanizer is provided with a stationary shoe 10 upon which the work to be vulcanized is adapted to be placed. This stationary shoe, as disclosed in Figs. 1, 2 and 3 particularly, comprises a rectangular horizontally disposed bottom plate 11 and an inverted dished upper plate 12 provided with a flat work engaging surface 13. As shown in Fig. 1, the plates 11 and 12 are riveted, or otherwise secured at their corners, as at 14, to the supporting flanges 5 of the side plates 2. A suitable insulating material, such as asbestos wool, indicated at 15, is disposed in the pocket formed between the dished upper plate 12 and the flat bottom plate 11. However, any other suitable heat insulating material may be used in this location.

Uniting the side plates 2 of the base section 1 are transversely extending upper and lower shoulder pins 16 and 17 respectively, which pins in addition to the plate 11 serve to maintain the stamped sheet metal plates 2 in properly spaced vertical order and in rigid unitary relationship. Additionally, the pin 16 serves as a fulcrum upon which is mounted the inner end of a swinging arm 18. This arm may also be formed from a pair of duplicate blanked metal sections, the outer portions of which terminate in a slotted handle 19. A coil spring 20 has its helical convolutions situated to surround the pin 16 and the opposite ends thereof engage respectively with the under edge portion of the arm 18 and with the upper edge portion of one of the plates 2, the said spring normally serving to hold the arm 18 in its open or elevated position disclosed in Fig. 1.

Arranged to be positioned between the bifurcated pivotal end of the arm 18 is a movable stem 21 which has its lower end pivotally mounted on the pin 17. The upper end of the stem 21 is threaded for the reception of an internally threaded spindle nut 22, which is adapted to be manually rotated. The lower end of the nut 22, as shown in Fig. 2, is adapted for engagement with the edge surfaces 23 formed in connection with the arm 18. The surfaces 23, when the arm 18 is lowered, lie in planes substantially perpendicular to the radius of an arc of which the pin 17 forms the center so that when the spindle nut is tightened, as disclosed in Fig. 2, the movable shoe 24 of the vulcanizer, which contains the electric heating element and which is movably suspended from the intermediate portion of the arm 18, may be forced into firm clamping engagement with, for instance, a rubber tire tube 25 to clamp the latter between the adjacent flat surfaces of the stationary and movable shoes 10 and 24 respectively. The pin 17 is also surrounded by the coils of a spring 26, the normal tendency of which is to rock the stem 21 in a downward direction, as opposed to the vertical lifting action of the spring 20 of the arm 18. By this construction, it will be seen that a rubber tire tube to be repaired may be readily placed on the upper surface of the stationary shoe with the rent or tear in the tire tube exposed to the view of the operator. The handle portion of the arm 18 is then grasped and the arm moved downwardly toward the tire tube, against the resistance of the spring 20, until the electrically heated movable shoe of the vulcanizer contacts with the upper surface of the tire tube, after the manner disclosed in Fig. 2. The nut 22 on the stem 21 is then tightened by being manually rotated so that a firm, positive, clamping pressure may be imparted to the work clamped between the stationary and movable shoes, so that the necessary degree of heat employed in vulcanizing operations of this character, may be readily applied to the work. When the vulcanizing operation is completed, the spindle nut is loosened, which allows the stem 21 to be rocked against the resistance of its spring 26 so that the spindle nut may clear the edge surfaces 23 of the arm 18. This allows the arm to respond to the influence of the spring 20, causing the elevation of said arm and the movable shoe carried thereby, thus providing for the ready removal of a tire tube, or other rubber object, from the vulcanizer.

One of the particular features of the invention resides in the novel construction of the movable shoe 24 and its internally disposed heating and switch mechanism. The movable shoe comprises a casing which is formed to include a rectangular, relatively thick sheet 27 of asbestos or other suitable material of both heat and electrical insulating value. To the top of the sheet 27 there is secured a substantially convex metal casing 28, and to the bottom of the sheet 27 there is applied a somewhat dished metallic plate 29. The upper portion of the casing 28 is provided with a bail 30 which surrounds the arm 18 and is provided with registering openings, aligned with one in said arm, for the reception of a transversely extending headed pin 31, removably retained in place by a cotter key 32. The opening in the arm 18 through which the pin 31 passes is preferably in the form of a triangulalr slot, as shown in Fig. 2, to provide for the proper centering and unyielding position of the movable shoe on the work to be vulcanized.

Arranged in the compartment 33 of the movable shoe, which is formed between the under surface of the asbestos sheet 27 and the top surface of the bottom plate 29 is an electric heating and resistance unit. This unit in the preferred form of my invention comprises a pair of spaced mica sheets 34, shown in Fig. 7, having slotted marginal edges for the reception of a relatively fine resistance wire capable of withstanding a relatively high degree of heat without corrosion, loss of strength or other forms of deterioration. In this capacity, the resistance conductor or resistor 35 may be formed from a number of alloys suitable for that purpose of which an alloy known as "Nichrome" may be given as an example. To complete an electric circuit through the resistor 35, current may enter by way of the usual lead-in conductors 36. The latter enter the casing 28 of the movable shoe through a socket 37, thence around a guide 38 to one of a pair of spaced contact strips 39, mounted on the upper surface of the sheet 27. Current is conducted from one of the strips 39 to the other by way of a movable bridge device 40 carried by a switch mechanism to be hereinafter described, and from the second of the strips 39, the current then passes by way of the line 41, disclosed in Fig. 5, to one of the resistor coils arranged in the compartment 33. From this first coil, current is transferred to the second complemental coil by way of the line 42 disclosed in Fig. 7. The current then flows through the second of the resistor coils and thence out of the vulcanizer by way of the line 43, disclosed in Fig. 5, which passes around a guide 38' to the socket 37.

The resistor conductors 35 are protected by means of upper and lower sets of mica sheets 44, or their equivalents, a thin sheet of soft asbestos 45 being disposed between the upper set of sheets 44 and the lower surface of the thick asbestos sheet 27. Between the lower set of mica sheets 44 and the bottom plate 29 of the casing 28, there is disposed a thin plate 46 of a metal possessing a high degree of heat conductivity by means of which the heat released from the coiled resistors is uniformly distributed over the entire area of the plate 29. By reason of the heat insulated sheets 27 and 45, the heat developed by the resistor coils is confined to the bottom plate 29, where it can be most effectively absorbed by the work undergoing vulcanization and dissipation or loss thereof minimized.

To effect the manual opening and closing of the resistor circuits, there is provided within the casing of the movable shoe a bracket 47 having a vertical wall. To this vertical wall at one end thereof is secured a horizontally disposed stud 48 provided with a sleeve 49. Loosely rotatable on the stud 48 is a pivotally movable switch member 50, having an upwardly disposed extension 51, which projects through a slot 52 provided in the upper wall of the casing 28 where it may be manually manipulated. Eccentrically pivoted as at 53 to the switch member 50 is the inner end of an arm 54 which has its outer end flanged as at 55 and received within grooves provided in the sides of the head 56, formed from a suitable dielectric material, of the bridge 40. The switch member 50 may likewise be formed from a molded insulating material, such as bakelite. The lower part of the head 56 carries the metallic bridge strip 57, the holder 58 of which is suitably embedded in the head 56. Connected with the stud 48 is the inner end of a wire spring 59, the outer end of said spring being connected with the arm 54. The pivotal mounting on the arm 54 on the switch member 50, and the relationship of the spring 59 to the pivotal edges of said switch member 50 is such that the spring 50 functions to positively maintain said arm in "off-center" positions. Thus, as shown in Fig. 4, the spring 59 serves to maintain the switch bridge in circuit closing relationship with the contact strips 39 when the extension 51 of the switch member 50 occupies its "on" position, and at the same time holding the switch member in its adjusted position. Similarly, when the switch member is manually or automatically moved to a circuit opening position, the spring 59 serves to elevate and maintain elevated the arm 54 in its position of circuit opening and to hold the switch member against accidental movement from its "off" position.

One of the outstanding features of the present invention resides in the employment of thermostatic means for automatically discontinuing a given heating or vulcanizing operation by opening the switch mechanism to interrupt circuit continuity after a desired vulcanizing temperature has been attained. As stated, this is done in order to prevent injury to the work undergoing vulcanization in the event the operator becomes inattentive or as so frequently happens in the operation of previous devices of this character, fails to open the circuit at the end of the vulcanizing period and within the required time. In the normal operation of my improved vulcanizer, the heating circuit is automatically opened but if desired may be manually opened at any time.

To effect such automatic opening, I employ a bi-metal thermostat 60, composed of a pair of metallic strips of dissimilar metals. These strips have certain of their ends riveted or otherwise secured as at 61 to the bottom plate 29 of the movable shoe. Arranged above the strips 60 is a spring metal strip 62, which is positioned between the upper of the strips 60 and the base flange 63 of the bracket 47, the entire assembly being rigidly retained in associated relationship by the rivets 61. The outer flexed end of the strip 62 is provided with an opening 64, as shown in Figs. 15 and 16, with which cooperates the lower end of a latch member 65. This latch member, as shown in Figs. 8 and 17, is pivotally movable around the axis of the stud 48 independently of the switch member 50 and carries a laterally projecting pin 66 which passes through an arcuate slot provided in the bracket 47. To the outer end of the pin 66 there is connected a strong coil spring 67, which spring has its other end attached to a lug 68 struck from the bracket 47. Normally, the latch member is arranged within a depression 69 formed in one face of the switch member 50. This depressed surface 69 of the latch member is provided with a shoulder 70 which engages with one edge of the latch member. It will be seen that when the switch member is moved from its "off" to its "on" position, the latch member will be revolved so that its lower end will be received within the opening 64 formed in the outer end of the strip 62. When the temperature around the bi-metal thermostat 60 reaches a predetermined point, the flexing of the thermostatic strips imparts similar movement to the strip 62, causing the latter to move to a position clear of the lower end of the latch member 65, thus allowing the latter to respond to the action of the spring 67 to effect the rotation of the switch member to its "off" position. The shape of the latch member 65 lying within the depression 69 is such that, if desired, the switch member may be moved manually from its "on" to its "off" position without regard to the automatic thermostatic control. The elongated slot 71 formed in the asbestos pad 27 provides for the reception of the thermostatic unit.

The outer ends of the thermostatic strip 60 and the spring steel strip 62 are united by means of a threaded bolt 72 carried by the strip 60. The adjusting and binding nuts 73 provided upon the bolt 72 may be adjusted to various distances from the upper surface of the steel strip 62 to provide for variations in the response of the latch to different temperatures so that in this manner different temperatures may be provided at which the thermostat will function to arrest heating operations. In the preferred form of my invention, I regulate the response of the thermostat at the factory and confine the same within the casing of the movable shoe so that it cannot be tampered with by unskilled persons and the usefulness of the device thereby interfered with. I may, however, as shown in Fig. 12, provide for some degree of exterior regulation of the thermostat response. This may be obtained by providing the outer end of the strip 60 with a threaded bolt as in the preferred form but the adjusting nut 74 is provided with a slot for a screw driver. A washer 75 may be secured to the strip 62 for the nut 74 to work against.

By placing a screw driver through the opening 76 shown in the top of the casing 28a, the positions of the set screw may be varied to change at will the operation of the thermostatic release.

In view of the foregoing, it will be seen that the present invention provides a novel and improved electric vulcanizer for effecting quickly and economically vulcanized repair of injured or damaged rubber or rubber containing objects. While the drawings illustrate shoes particularly designed for the repair of automobile tire tubes, nevertheless it will be appreciated that it is within the range of the invention to vary the curvature of these shoes so that they may be adapted for the repair of tire casings as well as tubes. It will be noted that the vulcanizer embodies a frame by which rubber bodies may be readily clamped in a secure and firmly retained relationship between the relatively movable shoes of the vulcanizer, and that the developed heat will be concentrated upon articles so clamped so that it may be used effectively and economically. In making the repair, it is merely necessary to properly clean the cut or rent in the tube, place an uncured patch over the rent, insert the tube between the relatively movable shoes of the vulcanizer and then clamp the movable shoe so that it will cover the damaged region to be vulcanized. This can be done by the tightening of the spindle nut on the threaded stem. The operation of the switch member 50 is then effected to heat the vulcanizer to the required temperature. The operator may or may not then give the vulcanizer further attention, since when the required temperature is attained, the thermostatic control automatically discontinues the heating operation without manual care on the part of the operator. This feature of control is in marked contrast with previous thermostats employed in electric vulcanizers which merely function to maintain a given vulcanizing temperature but do not operate to arrest or terminate the same. By my invention, an operator, after properly placing the work in the vulcanizer, may leave the same and proceed about other duties and when, later, time is afforded, may return to the vulcanizer and remove the finished or repaired article.

The heating cycle of my improved vulcanizer is indicated by the time temperature graph disclosed in Fig. 20 wherein the vertically extending spaced lines indicate minutes and seconds and the horizontally spaced lines temperature in degrees Fahrenheit. Thus an ordinary vulcanizing operation may take place in approximately six minutes time wherein the upper portion of the rubber patch attains a temperature of the order of 340° F. in two minutes and forty seconds. At this temperature, the thermostatic control functions to open the heating circuit and allows the operating temperatures to recede rapidly to normal. Greatly improved results have been found by this method of operation over standard electric vulcanizers which attain peak temperatures of the order of 265° F. I have discovered that by operating my improved vulcanizer as described, a damaged tire tube may be properly vulcanized without, as so often happens with the use of prior apparatus, over-curing the sound rubber of a tire tube adjacent to the point of vulcanization and destroying its elastic and wear-imparting properties. This is attributable to the fact that with the use of my apparatus, the high temperatures prevailing on the patch are not imparted to the balance of the tube surrounding the patch, due to the short time interval that the temperature is maintained above the vulcanizing point. Thus while the patch is permitted to attain a temperature of the order of 340° F., yet due to the fact that the heat is rapidly dissipated, the tube in contact with the bottom shoe may possess but a temperature of approximately 180° F.

Repeated tests made with the employment of scientific apparatus on tubes vulcanized with the apparatus comprising the present invention disclose that after being so vulcanized, the rubber of the tube possesses substantially all of its original properties of elasticity and resistance to wear.

The construction has the advantage of being simple, light in weight, and of exceptionally sturdy design so that it will readily withstand the relatively severe service to which devices of this kind are placed in actual operation.

I prefer to plate the lower vulcanizing surface of the movable heating shoe 24 with chromium or other equivalent smooth corrosion resisting metals, or the bottom plate may be formed entirely from a chromium-containing ferrous alloy in lieu of being plated. Apparently, the smoothness of this arrangement facilitates the vulcanizing operation, produces a union of improved appearance and allows for the desired flow of the heated rubber.

As shown in Fig. 19, the lead-in conductors 36 are embedded in grooves and suitably clamped in connection therewith in order to provide a firm mechanical union to prevent accidental pulls or other similar strains imparted to these conductors from breaking their proper engagement with the resistor windings. The grooves in which these conductors are embedded are of a tortuous form in order to more readily absorb longitudinal pulls or thrusts.

While I have described in considerable detail the constructional features of my improved vulcanizer as it is manufactured for commercial use, nevertheless, it will be appreciated that I do not desire to be limited to such details, but reserve the right to employ all such modifications and equivalents thereof that may be said to fall fairly within the scope of the following claims.

What is claimed is:

1. In an electric vulcanizer, a shoe comprising a casing consisting of top and bottom plates separated by a horizontal wall of insulating material, said wall producing upper and lower compartments in said casing, a resistance element responsive to the passage of electric current therethrough to develop heat, said resistance element being disposed in said lower compartment, switch mechanism for governing the passage of electric current through said resistance element arranged in said upper compartment, a single manually operated means projecting exteriorly of said casing for moving said switch mechanism to positions of circuit opening and closure against spring resistance, latch means for retaining said switch mechanism in its position of circuit closure, and thermostatic means responsive to the temperatures of the lower portion of said shoe for releasing said latch means to effect the automatic opening of said switch mechanism when the heat applying area of said shoe attains predetermined temperatures.

2. A heat applying shoe for vulcanizing rubber articles, comprising a casing having the lower portion thereof shaped to conform to rubber articles to be vulcanized, an electrically heated resistance element mounted within said casing and disposed immediately adjacent to the lower region of said casing, a wall of heat insulating material arranged within said casing immediately over said resistance element, means for electrically energizing said resistance element including a pair of spaced contacts, a switch mechanism including a manually rockable actuating member accessible from the exterior of said casing, a switch arm pivoted to said actuating member, a bridge carried by the outer end of said arm and arranged to be moved into and out of engagement with said spaced contacts to open or close the circuit in which the resistance element is located, spring means co-acting with said actuating member and said switch arm to maintain the latter positively in and out of engagement with said contacts, a spring actuated latch movable in unison with said switch actuating member, and thermostatic means responsive to the temperatures of the heat applying region of said shoe cooperative with said latch to effect its automatic release when a predetermined temperature has been attained, the release of said latch serving to effect the automatic withdrawal of the switch arm from circuit completing engagement with said contacts.

3. In an electric heater, a casing, resistor means disposed within said casing contiguous to the bottom thereof, terminals therefor, a switch mounted for swinging movement within said casing about a fixed axis, spring means for maintaining said switch positively in and out of circuit completing contact with said terminals, a latch lever pivotally mounted for swinging movement about said axis, a bar secured at one end to the bottom of said casing and having the outer end thereof engaged with the outer portion of said latch lever to normally restrain the latter against movement to effect the opening of said switch, and bi-metallic thermostatic strips connected with the outer portion of said bar and operable when the lower portion of said casing attains a predetermined temperature to flex said bar, whereby to effect the release of said lever and the automatic opening of said switch.

4. An electrically heated pressure shoe for vulcanizers comprising a casing having upper and lower members separated by a wall of heat insulating material, resistor means disposed within said casing contiguous to the bottom thereof and below said insulating wall, spaced terminals for said resistor means, a switch mounted for swinging movement within said casing about a fixed axis disposed above said insulating wall, spring means for maintaining said switch positively in and out of circuit completing contact with said terminals, a single manually operated means connected with said switch and projecting exteriorly of said casing for rocking movement about said axis, a latch lever pivotally mounted for swinging movement about said axis for moving said switch to its circuit opening position, a bar secured at one end to the bottom of said casing and having its outer end engaged with the outer portion of said latch lever to hold the latter in its position of switch closure, and bi-metallic thermostatic strips secured to the bottom of said casing and cooperative with said bar to flex the latter when the bottom of said casing attains a predetermined temperature to disengage said bar from said latch lever so that the resulting turning movement of the lever about said axis under spring force will move said switch member automatically to its circuit opening position.

5. An electrically heated pressure shoe for rubber vulcanizers comprising a casing, resistor means disposed within said casing contiguous to the bottom thereof, a bracket stationarily positioned within said casing, a switch for governing the passage of current through said resistor means pivotally supported by said bracket, spring means cooperative with said switch for positively maintaining the latter in its positions of circuit opening and closure, a pivoted actuating handle for said switch projecting exteriorly of said casing for manual actuation, said handle being pivotally movable about the axis of swinging movement of said switch, a latch lever turnable about said axis, the upper portion of said latch lever being seated within a recess provided in said handle, spring means cooperative with said latch lever and normally tending to rotate the same in a direction for effecting the opening of said switch, a flexible bar secured at one end to the bottom of said casing, the free end of said bar being engageable with the lower end of said latch lever to restrain the latter against rotation in response to the action of its associated spring means, and bi-metallic thermostatic strips mounted in connection with said casing contiguous to the bottom thereof and cooperative with said bar to flex the latter to effect the release of said latch lever when the bottom of the casing attains a predetermined temperature.

6. In an electric heater, a casing, resistor coils disposed within said casing contiguous to the bottom thereof, spaced terminals for said coils, a switch cooperative with said terminals, said switch including a latch lever, spring means normally tending to maintain said switch spaced from said contacts, a bar secured at one end to the bottom of said casing and having its free end engaged with said latch lever to maintain said switch in contact with said terminals against the influence of said spring means, and bi-metallic thermostatic strips connected with the bottom of said casing and cooperative with said bar to flex the outer end of the latter when the bottom of said casing attains a predetermined temperature whereby to effect the release of said latch lever and the automatic opening of said switch under the action of said spring means.

7. In an electric heater, a casing, resistor coils disposed within said casing contiguous to the bottom thereof, spaced terminals for said coils, a switch cooperative with said terminals, said switch including a latch lever, spring means normally tending to maintain said switch spaced from said contacts, a bar secured at one end to the bottom of said casing and having its free end engaged with said latch lever to maintain said switch in contact with said terminals against the influence of said spring means, bi-metallic thermostatic strips connected with the bottom of said casing and cooperative with said bar to flex the outer end of the latter when the bottom of said casing attains a predetermined temperature whereby to effect the release of said latch lever and the automatic opening of said switch under the action of said spring means, and adjustable threaded means carried by said strips for regulating the time of flexing response of said bar with respect to said strips.

8. In an electrically heated pressure shoe for vulcanizers, a casing provided with upper and lower members separated by an intervening wall of heat insulating material, said lower member being formed from metal, electrically heated resistance means arranged within the lower part of said casing below said insulating wall, and a thin metallic plate of higher thermal conductivity than said lower member arranged within said casing in direct contact with the upper surface of said lower member and separating the latter from said resistance means, said plate serving to uniformly distribute the heat of said resistance means over the full area of said bottom member.

ESTEL C. RANEY.